US010808950B2

(12) United States Patent
Nanjappa et al.

(10) Patent No.: US 10,808,950 B2
(45) Date of Patent: Oct. 20, 2020

(54) FILTER TRACK ASSEMBLY FOR HVAC UNITS

(71) Applicant: Johnson Controls Technology Company, Auburn Hills, MI (US)

(72) Inventors: Vinay Nanjappa, Bangalore (IN); Nitin C. Dabade, Sangli (IN); Vishal S. Jagtap, Thane (IN); Prashanti S. Dhawan, Pune (IN); Marcel P. Ferrere, Dalmatia, PA (US); Rajiv K. Karkhanis, York, PA (US); Curtis W. Caskey, Dallastown, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 250 days.

(21) Appl. No.: 15/960,318

(22) Filed: Apr. 23, 2018

(65) Prior Publication Data

US 2019/0277517 A1    Sep. 12, 2019

Related U.S. Application Data

(60) Provisional application No. 62/641,893, filed on Mar. 12, 2018.

(51) Int. Cl.
| | | |
|---|---|---|
| *B01D 46/02* | (2006.01) | |
| *F24F 13/28* | (2006.01) | |
| *F24F 3/16* | (2006.01) | |
| *B01D 46/52* | (2006.01) | |
| *B01D 46/00* | (2006.01) | |

(52) U.S. Cl.
CPC ........ *F24F 3/1603* (2013.01); *B01D 46/0005* (2013.01); *B01D 46/0006* (2013.01); *B01D 46/0023* (2013.01); *B01D 46/02* (2013.01); *B01D 46/521* (2013.01); *F24F 13/28* (2013.01); *B01D 2279/50* (2013.01); *F24F 2003/1614* (2013.01); *F24F 2003/1657* (2013.01)

(58) Field of Classification Search
CPC ............ B01D 46/0005; B01D 46/0023; B01D 46/0006; B01D 46/02; B01D 46/521; B01D 2279/50; F24F 3/1603; F24F 13/28; F24F 2003/1657; F24F 2003/1614
USPC ........... 55/481, 482, 484, 502, 511, DIG. 31
See application file for complete search history.

(56) References Cited

U.S. PATENT DOCUMENTS

| | | | | |
|---|---|---|---|---|
| 3,486,311 | A | * | 12/1969 | Allan, Jr. ................. F24F 13/28 55/355 |
| 5,743,054 | A | * | 4/1998 | Luchetti ............... A47B 83/001 52/220.7 |
| 5,788,729 | A | | 8/1998 | Jurgensmeyer |
| 6,099,612 | A | * | 8/2000 | Bartos ................ B01D 46/0005 55/481 |

(Continued)

FOREIGN PATENT DOCUMENTS

| | | |
|---|---|---|
| CN | 202328575 | 7/2012 |
| CN | 203454373 | 2/2014 |
| CN | 206037373 | 3/2017 |

*Primary Examiner* — Minh Chau T Pham
(74) *Attorney, Agent, or Firm* — Fletcher Yoder, P.C.

(57) ABSTRACT

A heating, ventilating, and air conditioning (HVAC) unit includes a filter track assembly that includes a bulkhead frame, a first rail configured to support a first air filter, and a second rail configured to support a second air filter. The first rail and the second rail are coupled to the bulkhead frame, and the first rail and the second rail are disposed on opposing sides of the bulkhead frame.

25 Claims, 13 Drawing Sheets

(56) References Cited

U.S. PATENT DOCUMENTS

| | | | |
|---|---|---|---|
| 8,348,071 B1 | 1/2013 | Janlert | |
| 8,388,714 B2 | 3/2013 | Kearsley | |
| 8,999,029 B1 * | 4/2015 | Brandt | B01D 46/0006 55/484 |
| 10,434,448 B1 * | 10/2019 | Honnecke | B01D 46/0006 |
| 2005/0044829 A1 | 3/2005 | Chase | |
| 2006/0016163 A1 * | 1/2006 | O'Connor | B01D 46/0005 55/481 |
| 2006/0037296 A1 * | 2/2006 | Duffy | B01D 46/0001 55/495 |
| 2010/0037574 A1 * | 2/2010 | Weber | F24F 13/28 55/496 |
| 2010/0101197 A1 * | 4/2010 | Livingstone | B01D 46/0006 55/356 |
| 2013/0199140 A1 * | 8/2013 | Mock | B01D 46/0005 55/484 |
| 2014/0230385 A1 | 8/2014 | Schuld et al. | |
| 2015/0354874 A1 * | 12/2015 | Cur | F24F 3/1603 62/216 |
| 2016/0052095 A1 * | 2/2016 | Simmons | B01D 46/0005 29/281.5 |
| 2020/0056805 A1 * | 2/2020 | Stewart | F24F 13/22 |

* cited by examiner

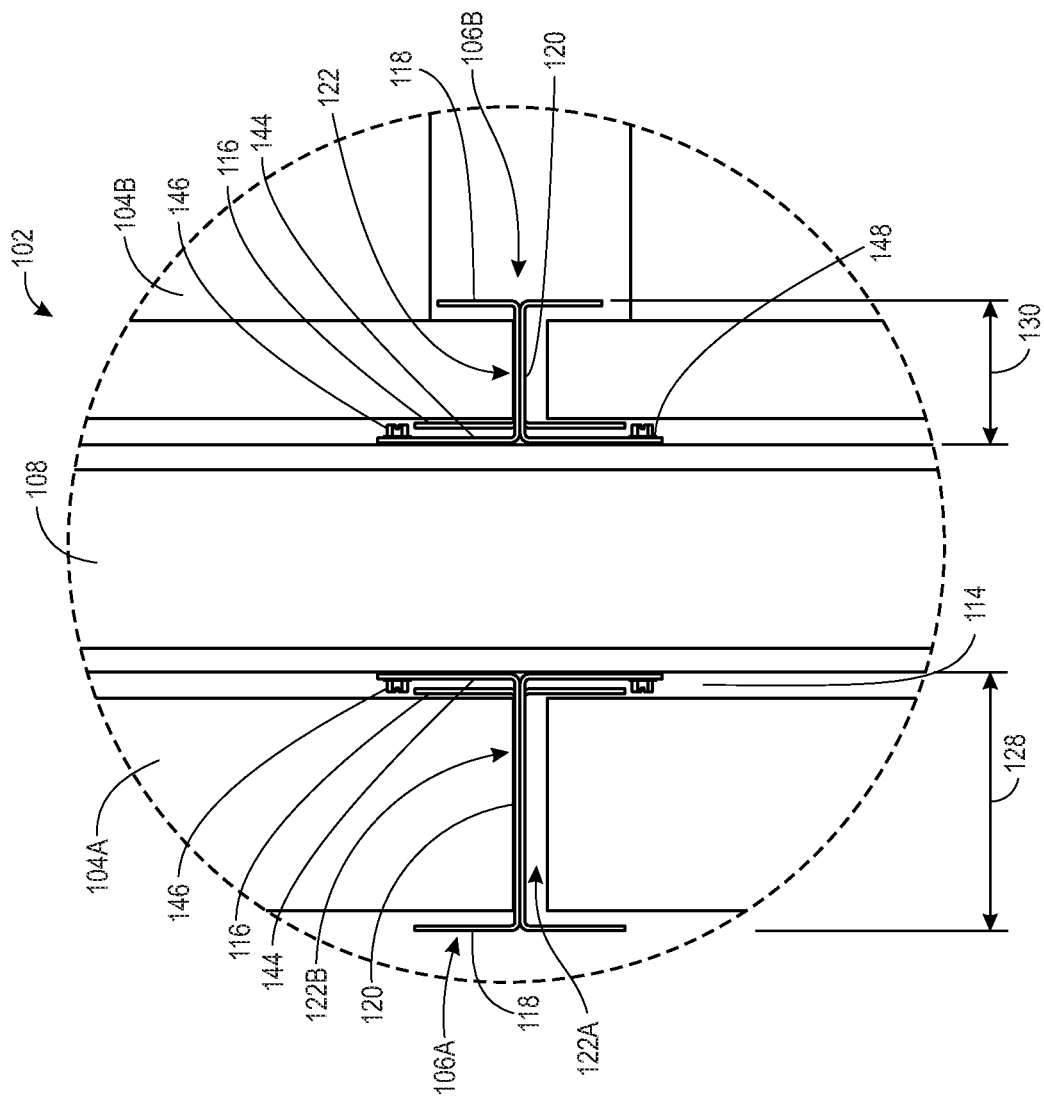

FILTER TRACK ASSEMBLY FOR HVAC UNITS

CROSS REFERENCE TO RELATED APPLICATIONS

This application claims priority from and the benefit of U.S. Provisional Application Ser. No. 62/641,893, entitled "FILTER TRACK ASSEMBLY FOR HVAC UNITS," filed Mar. 12, 2018, which is hereby incorporated by reference.

BACKGROUND

The present disclosure relates generally to heating, ventilation, and air conditioning (HVAC) systems. A wide range of applications exist for HVAC systems. For example, residential, light commercial, commercial, and industrial HVAC systems are used to control temperatures and air quality in residences and other buildings. Certain HVAC units can be dedicated to either heating or cooling, although many HVAC units are capable of performing both functions. HVAC units may also provide ventilation to a conditioned interior space. In general, HVAC systems operate by implementing a thermodynamic cycle in which a refrigerant undergoes alternating phase changes to remove heat from or deliver heat to a conditioned interior space of a building. Heating may also be provided by heat pumps, gas furnace heat exchangers, electric resistance heat, or steam or hot water coils. Similar systems are used for vehicle cooling, and as well as for other types of general refrigeration, such as refrigerators, freezers, and chillers.

HVAC systems, such as commercial rooftop units, include air filters. Various types of filters employed include pleated filters, rigid filters, and bag filters. In some cases, the filters be slid into and out of tracks or rails designed to hold the filters in place within the unit. For example, in some systems, two tracks that can accommodate different types of filters may be positioned on one side of a filter track assembly. In some cases, tracks may sag over time, which can make replacing air filters and servicing the HVAC system more difficult and costly.

SUMMARY

The present disclosure relates to a heating, ventilating, and air conditioning (HVAC) unit that includes a filter track assembly that includes a bulkhead frame, a first rail configured to support a first air filter, and a second rail configured to support a second air filter. The first rail and the second rail are coupled to the bulkhead frame, and the first rail and the second rail are disposed on opposing sides of the bulkhead frame.

The present disclosure also relates to a filter track assembly for a heating, ventilation, and air conditioning (HVAC) system. The filter track assembly includes a frame, a first rail configured to receive a first air filter, and a second rail configured to receive a second air filter. The first rail is disposed on a first side of the frame, and the second rail is disposed on a second side of the frame.

The present disclosure further relates to a filter track assembly that includes a vertical bulkhead; a plurality of rails coupled to the vertical bulkhead. Each rail of the plurality of rails is configured to support at least one air filter, and the plurality of rails includes a first rail and a second rail that is disposed on an opposite side of the vertical bulkhead from the first rail.

BRIEF DESCRIPTION OF THE DRAWINGS

FIG. 14 is a side view of a filter track assembly, in accordance with embodiments described herein;

FIG. 15 is a side view of a portion of the filter track assembly of FIG. 11, in accordance with embodiments described herein;

DETAILED DESCRIPTION

The present disclosure is directed to a filter track assembly for HVAC units. As mentioned above, air filters may be slidably installed and removed from filter tracks or rails within an HVAC unit. However, in many cases where an HVAC unit allows for two types of filters to be used simultaneously, such as HVAC units with two or more filter tracks, the filter tracks may sag or bend relative to a frame to which the tracks are mounted over time. For example, in units with filter track assemblies in which the two or more filter tracks are positioned on the same side of the HVAC mounting frame, the filter tracks may be prone to sagging or bending due to forces and/or moments acting on the filter tracks. This sagging or bending may make servicing such an HVAC unit more difficult. For instance, it may become more difficult to remove air filters and install new air filters. As set forth below, present embodiments generally relate to a filter track assembly in which filter tracks are positioned on opposite sides of a filter track assembly relative to a support frame of the HVAC unit. More specifically, vertical bulkheads or support frames of a filter track assembly may be disposed between filter tracks that are configured to receive air filters. Accordingly, the presently disclosed filter track assembly enables the weight of the air filters to be more evenly distributed across the filter track assembly than in filter track assemblies with tracks positioned on the same side of a vertical bulkhead.

Figure 1:
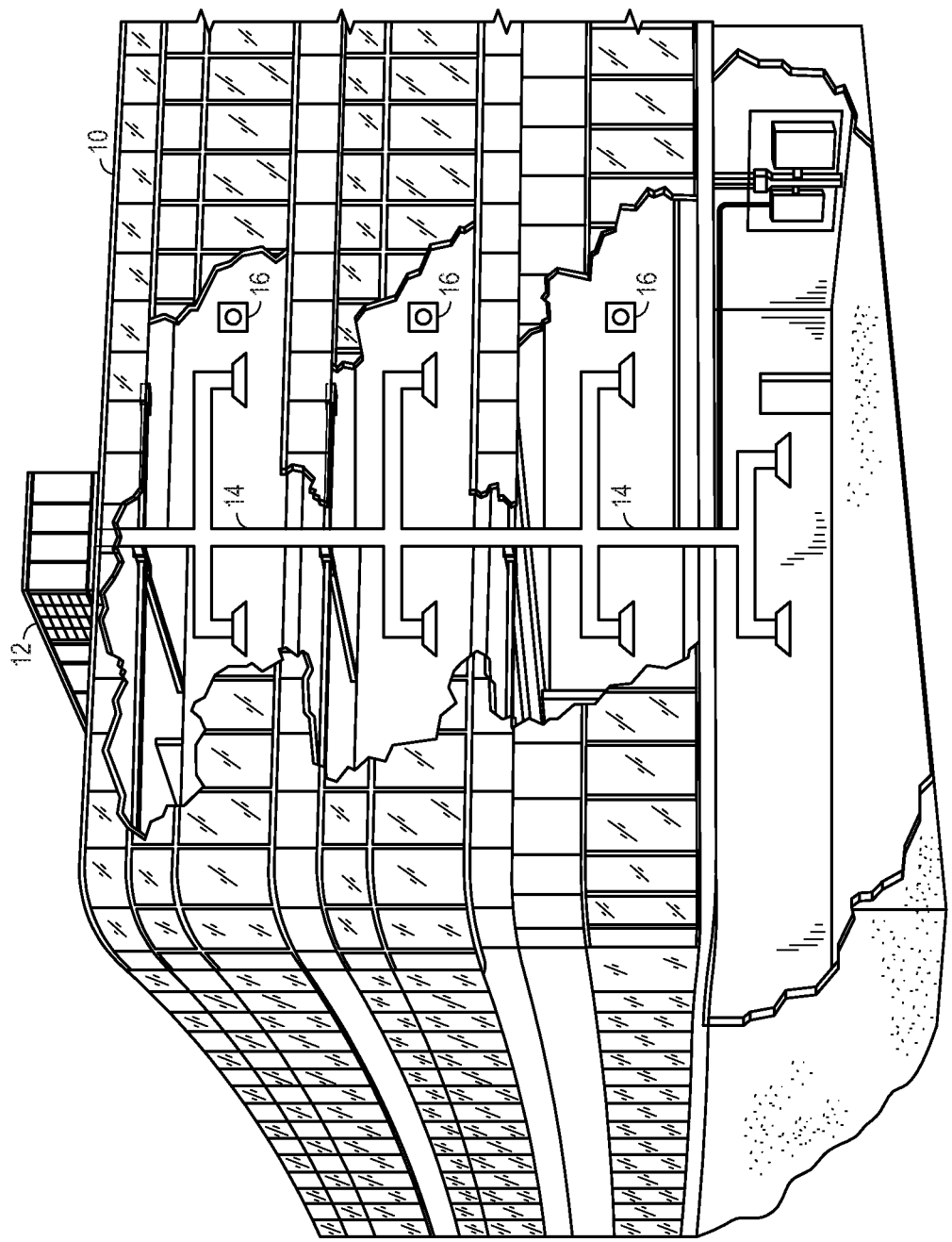
FIG. 1 is a perspective view a heating, ventilating, and air conditioning (HVAC) system for building environmental management, in accordance with embodiments described herein.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
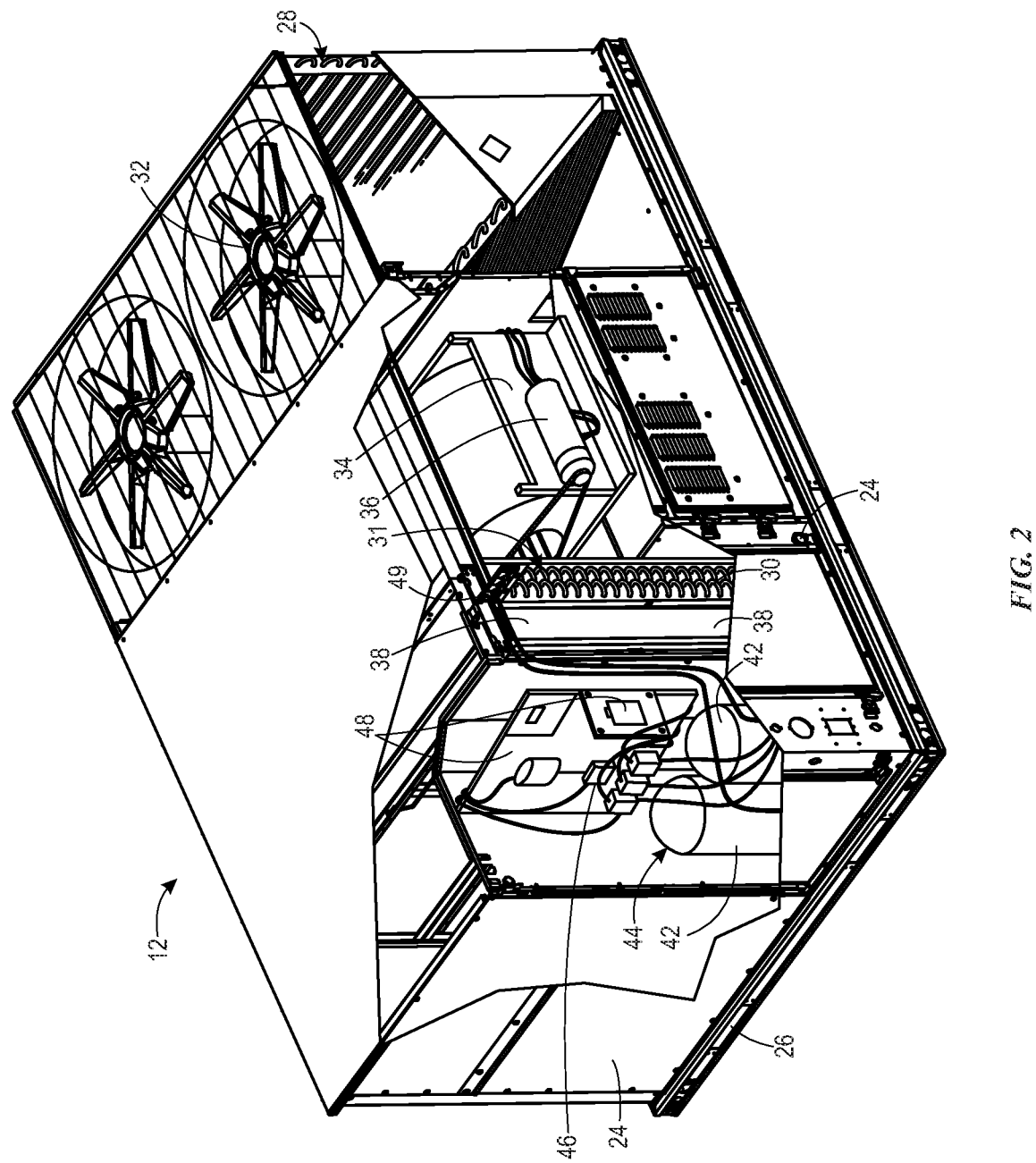
FIG. 2 is a perspective view of the packaged HVAC unit of the HVAC system of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel and/or microchannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
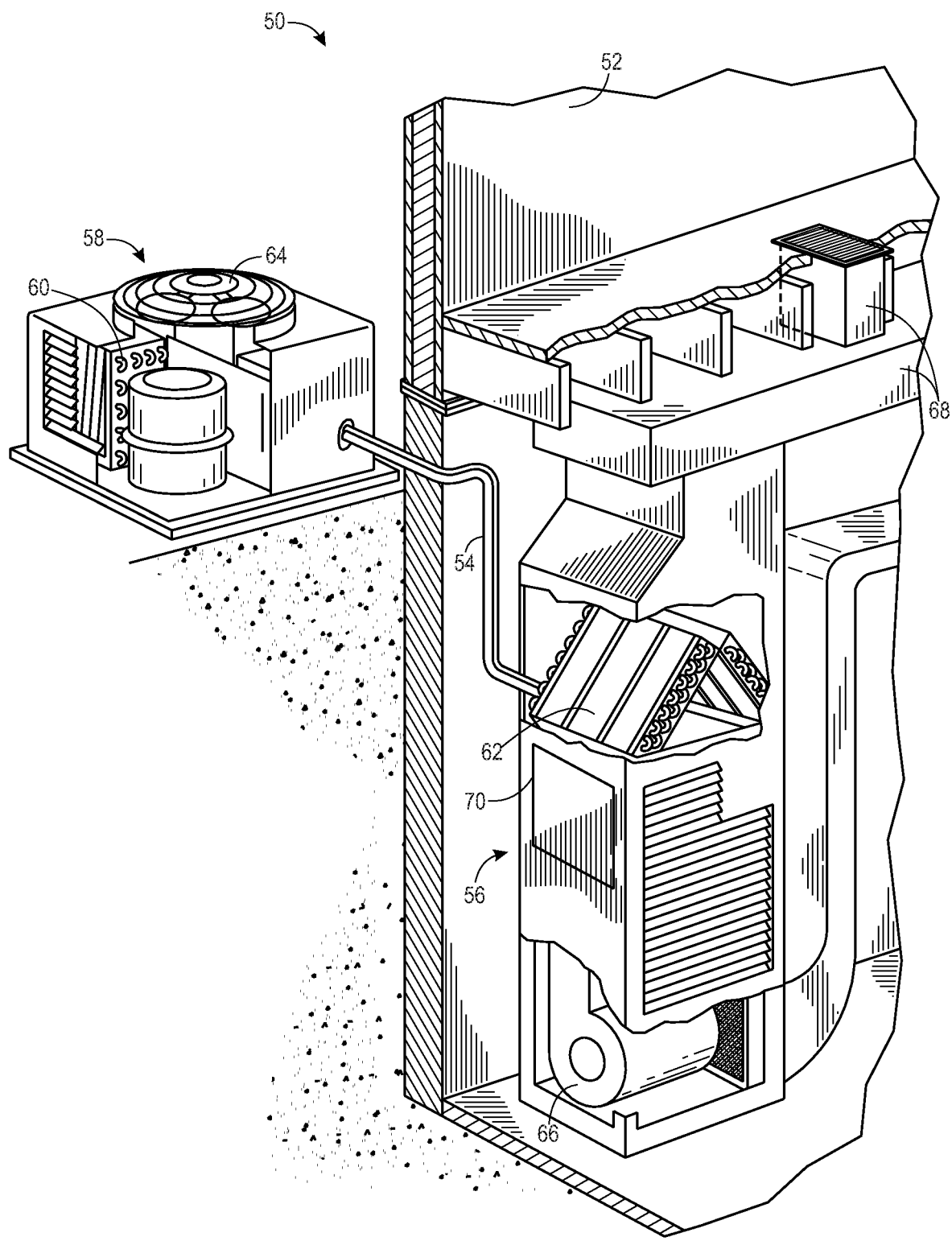
FIG. 3 is a perspective view of a residential HVAC system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
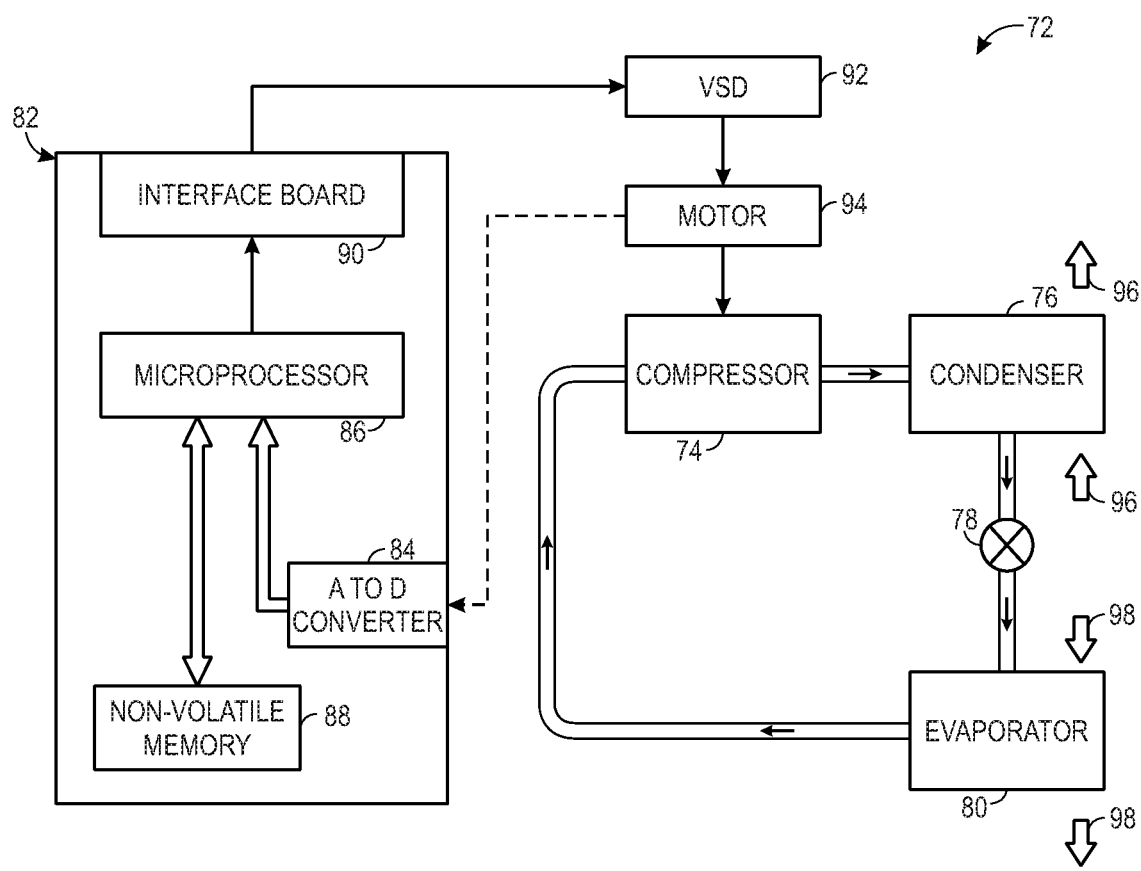
FIG. 4 is a schematic diagram of a vapor compression system that may be used in the packaged HVAC system of FIG. 2 and the residential HVAC system FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, HVAC units supply conditioned air to a conditioned space, such as a conditioned interior space of building 10. In many cases, HVAC units may include air filters that filter air prior to being conditioned. For example, the HVAC unit 12 may include air filters that filter environmental air and/or return air. As discussed below, the HVAC unit 12 may include a filter track assembly into which air filters may be at least partially disposed. For example, and as elaborated upon below, a filter track assembly may include rails disposed on opposite sides of vertical bulkheads of the filter track assembly, and portions of air filters may be slid into and out of each of the rails. It should further be noted that techniques of the present disclosure are generally discussed with respect to rooftop units such as the HVAC unit 12, but the present techniques may be employed in other types of HVAC units and HVAC systems, such as residential HVAC units or split HVAC systems.

Figure 5:
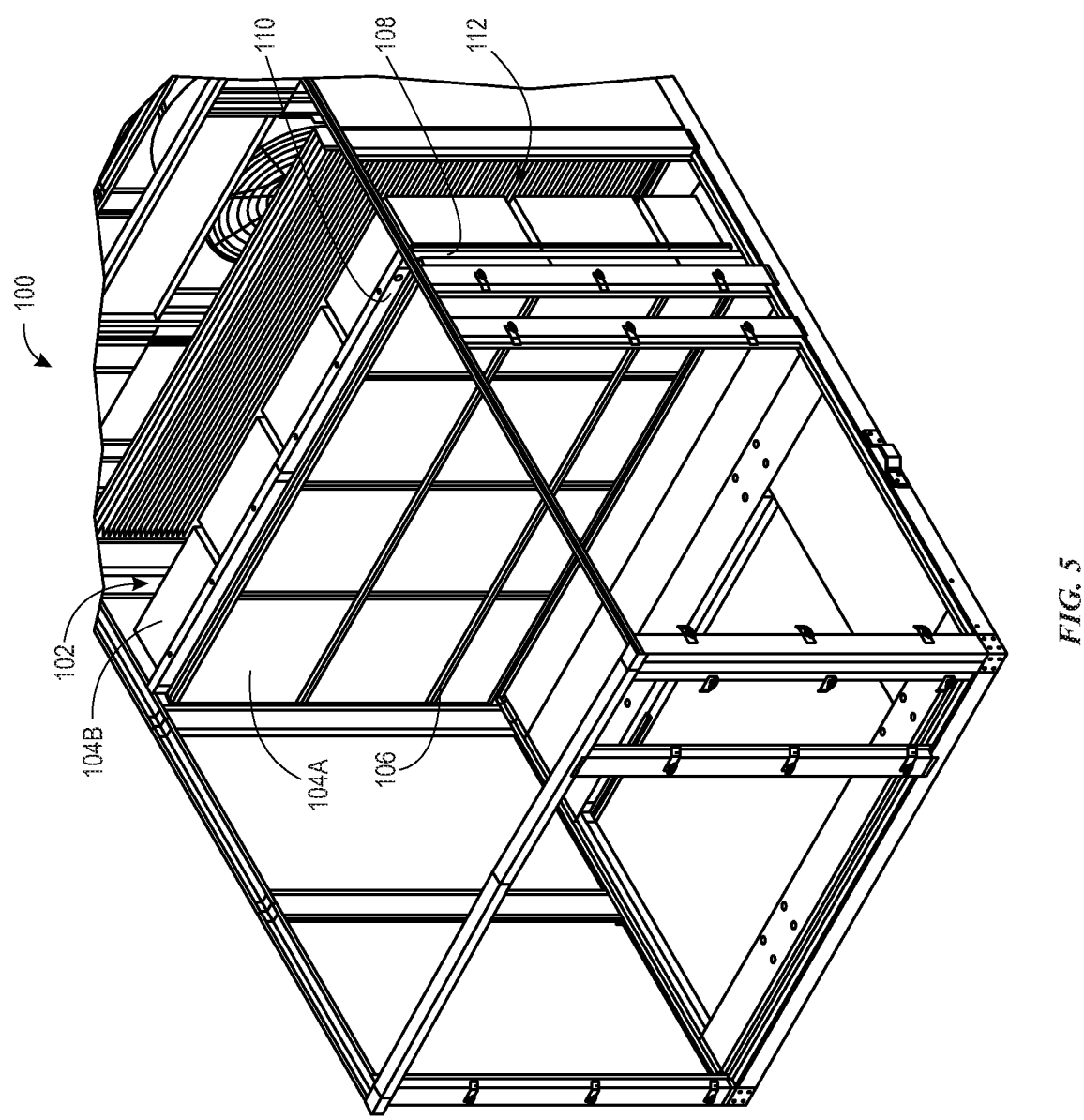
FIG. 5 is a perspective view of an HVAC system that includes a filter track assembly, in accordance with embodiments described herein.

With the foregoing discussion in mind, FIG. 5 is a perspective view of an HVAC system 100 that includes an embodiment of the HVAC unit 12. As illustrated, the HVAC unit 12 includes a filter track assembly 102 that holds air filters 104, such as pleated filter 104a and rigid or bag filters 104b. More specifically, the filter track assembly 102 includes rails 106 that are supported by a vertical bulkhead 108 of the filter track assembly 102 within the HVAC unit 100. As discussed in more detail below, the rails 106 may be disposed on opposite sides of the vertical bulkhead 108, which enables the weight of the filters 104 to be distributed relatively close to the vertical bulkheads 108 and horizontal bulkheads 110 of the filter track assembly 102 compared to filter track assemblies having two or more rails 106 disposed on the same side of a vertical bulkhead. As used herein, "vertical bulkheads" and "horizontal bulkheads" refer to structural frame members or components that support the rails 106 and filters 104 positioned within the rails 106. As will be appreciated, the structural frame members or components may have any suitable orientation within the HVAC system 100 and may include orientations that are not necessarily vertical or horizontal. Additionally, in other embodiments of the HVAC unit 12, more than one filter track assembly 102 may be included. For example, in some embodiments, a second filter track assembly 102 may also be included within the HVAC unit 12 to enable inclusion of more filters within the HVAC unit 12.

During operation of the HVAC unit 12, the filters 104 of the filter track assembly 102 filter air that is supplied to a conditioned space, such as building 10 of FIG. 1. For instance, environmental air and/or return air from the conditioned space may pass through the filters 104a, which remove unsuitable matter from the air, such as dust, pollen, leaves, and many other object and particles. More specifically, the air passes through the pleated filters 104a prior to passing through the rigid or bag filters 104b. Over time, the filters 104 may be removed from the rails 106 and replaced. For instance, the filters 104 can be accessed via an opening 112, which may be enclosed via a door or panel.

Figure 6:
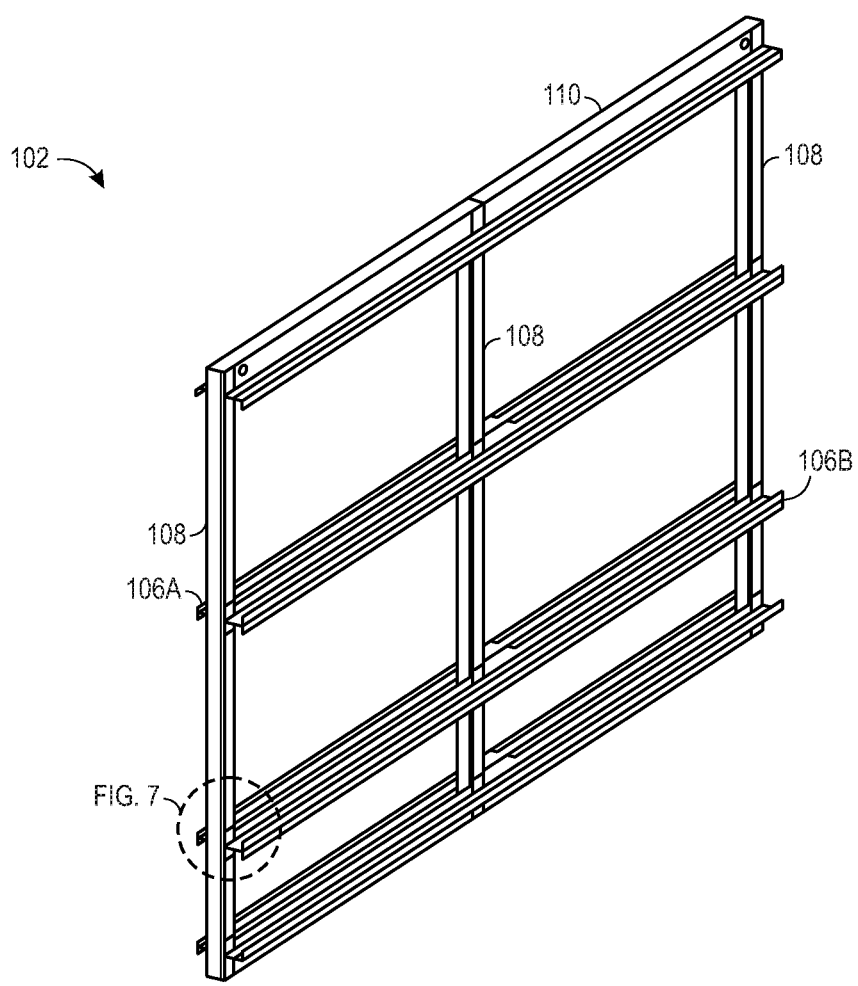
FIG. 6 is a perspective view of the filter track assembly of FIG. 5, in accordance with embodiments described herein.

Keeping the discussion of FIG. 5 in mind, FIG. 6 is a perspective view of an embodiment of the filter track assembly 102. As shown, the rails 106 are positioned along opposite sides of the vertical bulkheads 108. For example, the rails 106a, into which pleated filters 104a may be positioned, may be positioned on one side of the vertical bulkheads 108, while rails 106b, which may receive rigid or bag filters 104b, may be attached to an opposite side of the vertical bulkheads 108. Additionally, while the illustrated embodiment of the filter track assembly 102 includes three vertical bulkheads 108, in other embodiments, the filter track assembly 102 may include fewer or more than three vertical bulkheads 108. For instance, other embodiments of the filter track assembly 102 may include two, four, five, or more vertical bulkheads 108.

Figure 7:
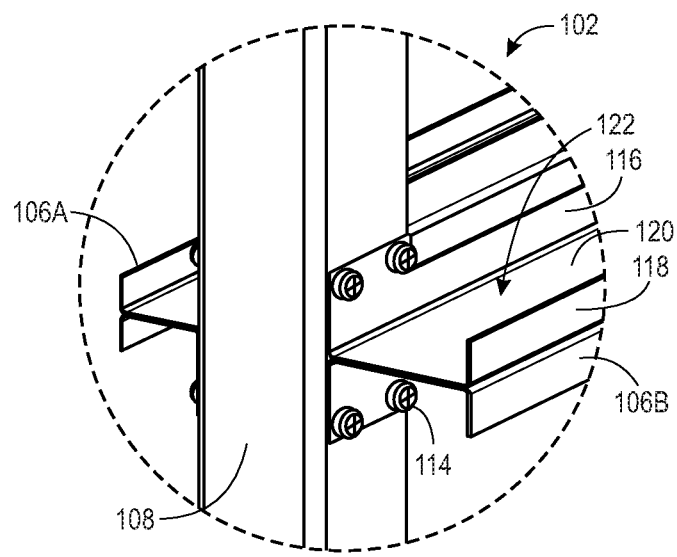
FIG. 7 is a perspective view of a portion of the filter track assembly of FIG. 6, in accordance with embodiments described herein.

FIG. 7 is a perspective view of a portion of the embodiment of the filter track assembly 102 shown in FIG. 6. As illustrated, rails 106 may be secured to the vertical bulkhead 108 with fasteners, such as pan head screws 114. However, in other embodiments, other types of fasteners or securement techniques may be employed. For instance, in other embodiments, rivets or other types of screws such as flat head screws may be used to secure the rails 106 to vertical bulkheads 108. Moreover, in other embodiments, the rails 106 may be attached to the vertical bulkheads 108 via welding.

Moreover, the rails 106 include various surfaces, such as inner flange 116, outer flange 118, and inner surface 120. The inner flange 116, outer flange 118, and inner surface 120 form a groove 122 into which air filters 104 can be inserted via sliding. For example, as elaborated below with respect to FIG. 8 and FIG. 9, air filters 104 may be secured within the filter track assembly 102 by sliding the air filters 104 into grooves 122 of rail 106 that have opposite orientations.

Figure 8:
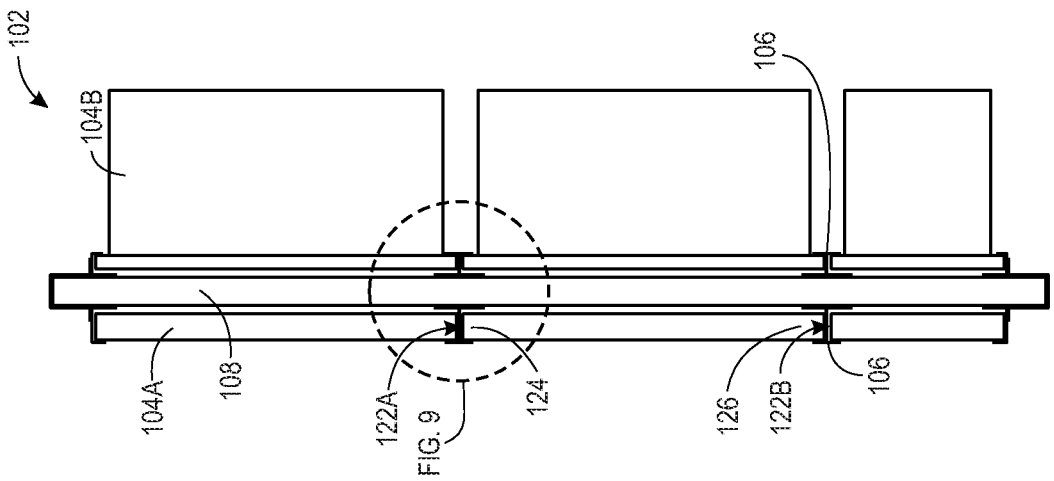
FIG. 8 is a side view of the filter track assembly of FIG. 6, in accordance with embodiments described herein.

FIG. 8 is a side view of the embodiment of the filter track assembly 102 illustrated in FIG. 6. As illustrated, each air filter 104 is held in place by two tracks 106 that are secured to the vertical bulkhead 108 in opposite orientations. For instance, a top portion 124 of each air filter 104 is positioned within a groove 122a of one of the tracks 106 that faces downwards, while a bottom portion 126 of each air filter 104 is disposed within a groove 122b of one of the tracks 106 that faces upwards. Together, the two tracks 106 capture the air filter 104 to hold the air filter 104 in place within the HVAC system 100.

Figure 9:
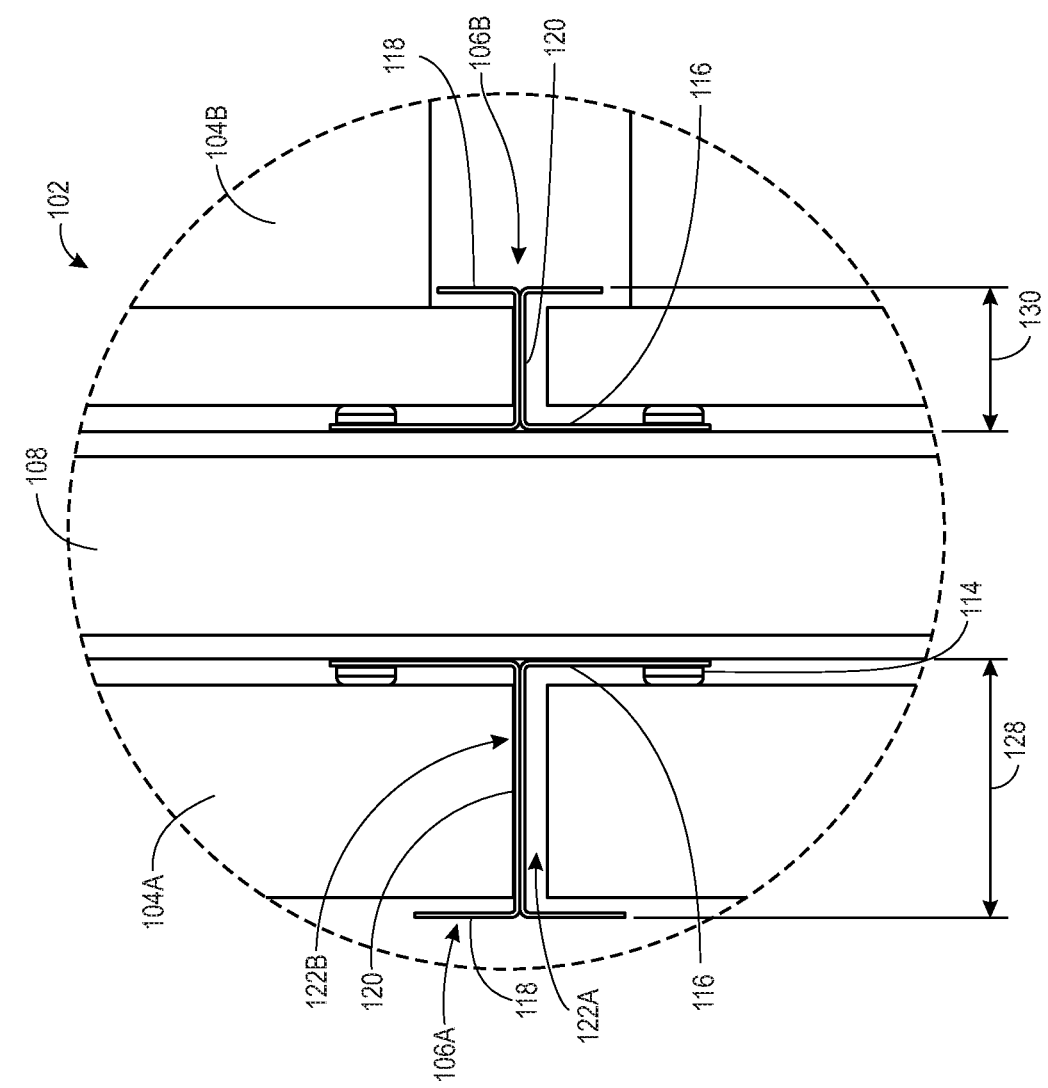
FIG. 9 is a side view of a portion of the filter track assembly of FIG. 8, in accordance with embodiments described herein.

FIG. 9 is a side view of a portion of the embodiment of the filter track assembly 102 shown in FIG. 8. As illustrated, the rail 106a has a thickness or depth 128 that is greater than a thickness or depth 130 associated with the rail 106b. However, in other embodiments, two tracks 106 of the same thickness may be used. For instance, in embodiments in which rails 106 positioned on opposite sides of the vertical bulkhead 108 hold pleated filters 104a, rails 106a of thickness 128 may be used.

As additionally illustrated, rails 106 may abut one another. For instance, a rail 106 used to support a bottom portion of an air filter 104 may rest atop another rail 106 that holds a top portion of another air filter 104 in place. While two separate rails 106 provide grooves 122a and 122b, in other embodiments, the grooves 122a and 122b may be formed from a single piece. In other words, the abutting rails 106 shown in FIG. 9 may be formed as a single piece instead of two separate rails 106 that abut one another.

Figure 10:
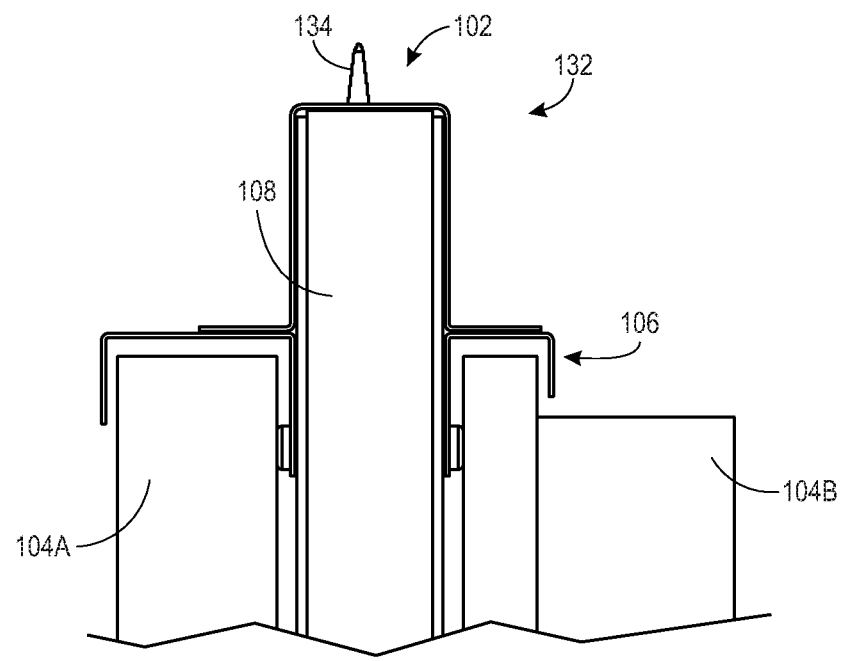
FIG. 10 is a side view of a top portion of a filter track assembly, in accordance with embodiments described herein.
Figure 11:
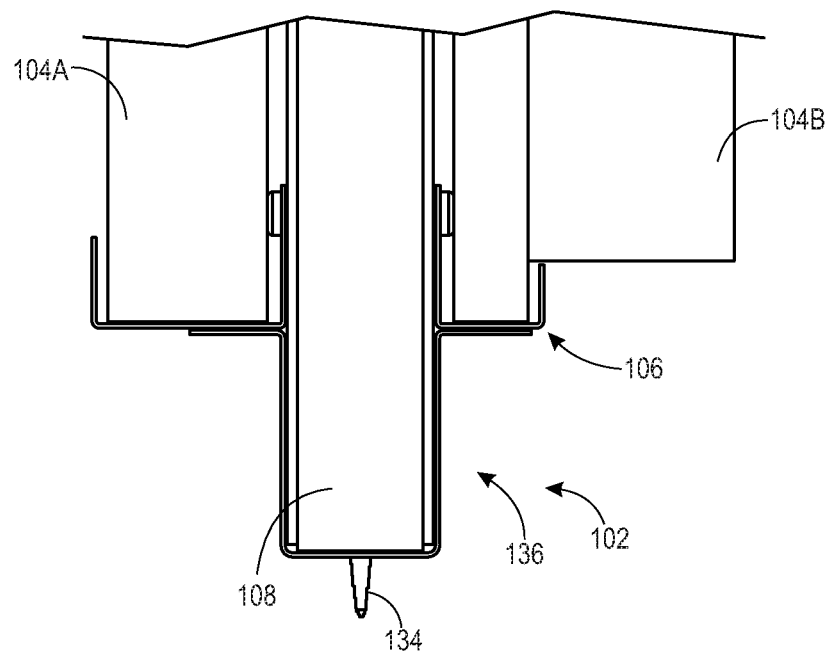
FIG. 11 is a side view of a bottom portion of a filter track assembly, in accordance with embodiments described herein.

The filter track assembly 102 may be secured to the HVAC unit 12 in a number of ways. For example, as illustrated in FIG. 10, which is a side view of a top portion 132 of an embodiment of the filter track assembly 102, screws 134 may be employed to secure the filter track assembly 102 within an HVAC unit, such as HVAC unit 12. More specifically, the screws 134 may be disposed along one of the horizontal bulkheads 110 and screwed into the HVAC unit 12. Some of the screws 134 may also be located partially within the vertical bulkheads 108 of the filter track assembly 102. Screws 134 may also be used to secure a bottom portion of the filter track assembly 102 to the HVAC unit. For instance, FIG. 11 is a side view of a bottom portion 136 of an embodiment of the filter track assembly 102. As illustrated, screws 134 may be disposed in one of the horizontal bulkheads 110 of the filter track assembly 102, thus enabling the filter track assembly 102 to be secured to a bottom surface within the HVAC unit 12.

Figure 12:
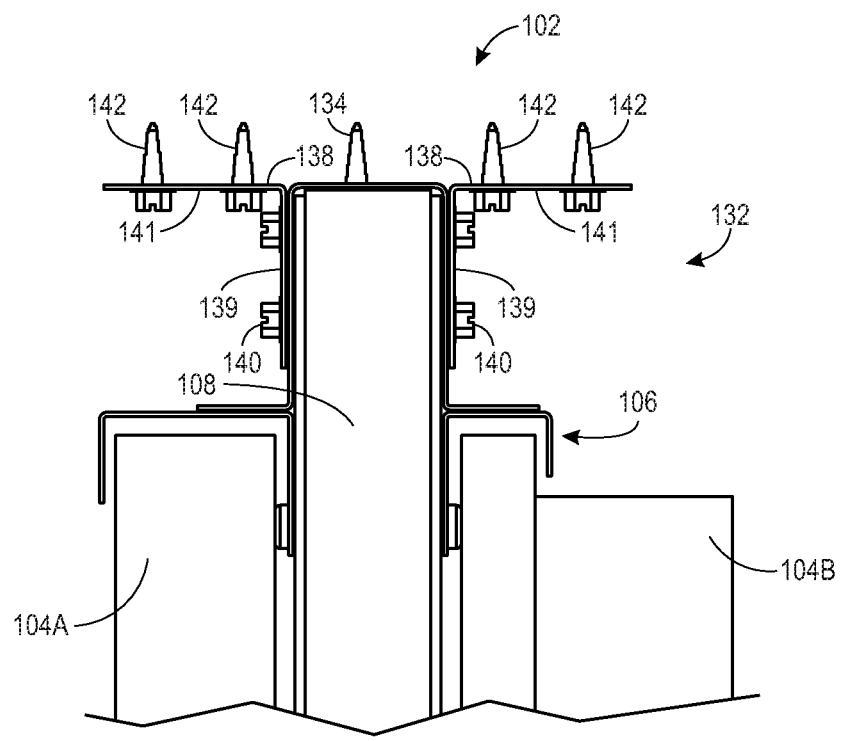
FIG. 12 is a side view of a top portion of a filter track assembly, in accordance with embodiments described herein.

In other embodiments, the filter track assembly 102 may be secured to the HVAC unit 12 using other techniques. For example, FIG. 12 is a side view of embodiment of the filter track assembly 102 in which L-shaped brackets 138 are used in addition to screws 134. For instance, vertical portions 139 of the L-shaped brackets 138 may be secured to vertical bulkheads 108 and/or horizontal bulkheads 110 of the filter track assembly 102 via screws 140, and horizontal portions 141 of the L-shaped brackets 138 may be secured to the HVAC unit 12 via the screws 142. It should be noted that, in other embodiments, the L-shaped brackets 138 may be used without the screws 134 disposed along one of the horizontal bulkheads 110 and screwed into the HVAC unit 12.

Figure 13:
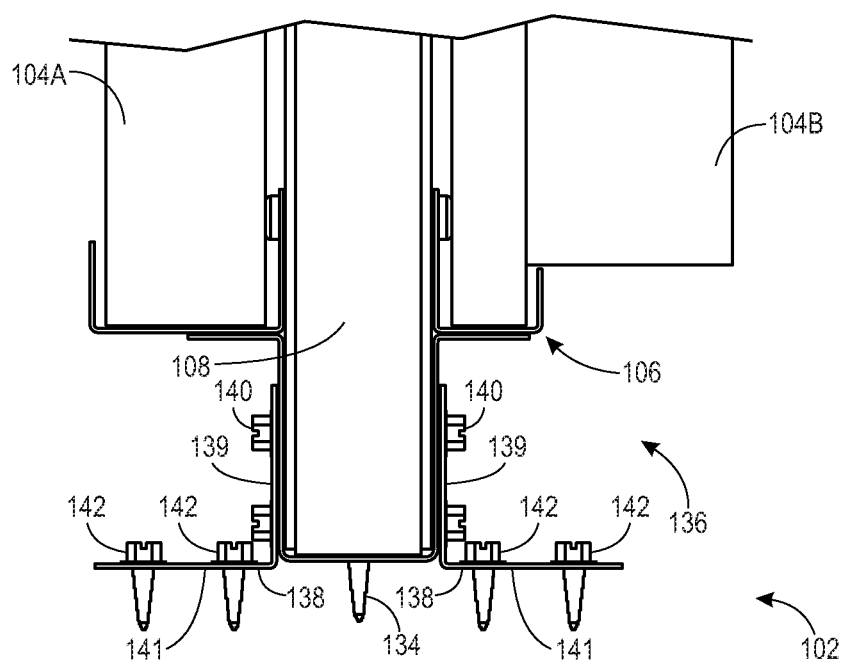
FIG. 13 is a side view of a bottom portion of a filter track assembly, in accordance with embodiments described herein.

L-shaped brackets 138 may also be used to secure the bottom portion 136 of the filter track assembly 102 to an HVAC unit. FIG. 13 is a side view of the bottom portion 136 of the filter track assembly 102. As illustrated, L-shaped brackets 138 are secured to the filter track assembly 102, such as the vertical bulkheads 108 and/or the horizontal bulkheads 110, via screws 140, and the L-shaped brackets 138 may be secured to a bottom surface within an HVAC unit via the screws 142.

FIG. 14 is a side view of another embodiment of the filter track assembly 102. In particular, filter tracks 106 may include three flanges, two of which form a groove into which filters 104 may be positioned, and the third flange being coupled to the vertical bulkhead 108. For instance, FIG. 15 is a side view of a portion of the filter track assembly 102 of FIG. 14. As illustrated, each rail 106 includes an inner flange 116 and an outer flange 118 that extend substantially perpendicular from an inner surface 120 to form a groove 122. Additionally, each of the rails 106 includes a coupling flange 144 that may be coupled to the vertical bulkhead 108 or the horizontal bulkhead 110 via screws 146 and washers 148.

Figure 16:
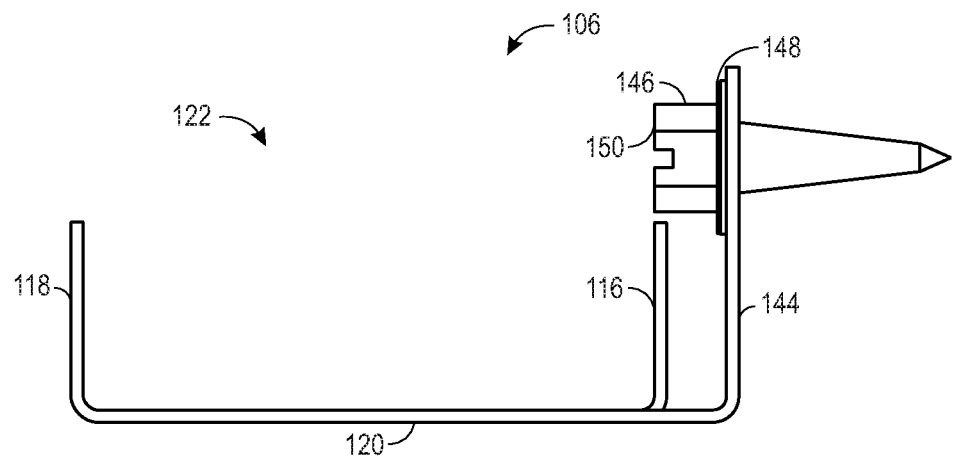
FIG. 16 is a side view of a rail of the filter track assembly of FIG. 15, in accordance with embodiments described herein.

FIG. 16 is a side view of the embodiment of the rail 106 shown in FIG. 15. As illustrated, face 150 of the screw 146 is generally flush with the inner flange 116. Because the screws 146 are generally flush with the inner flange 116 of the rails 106, filters 104 may be slid into the grooves 122 of the rails 106 without any interference from the screws 146.

Figure 17:
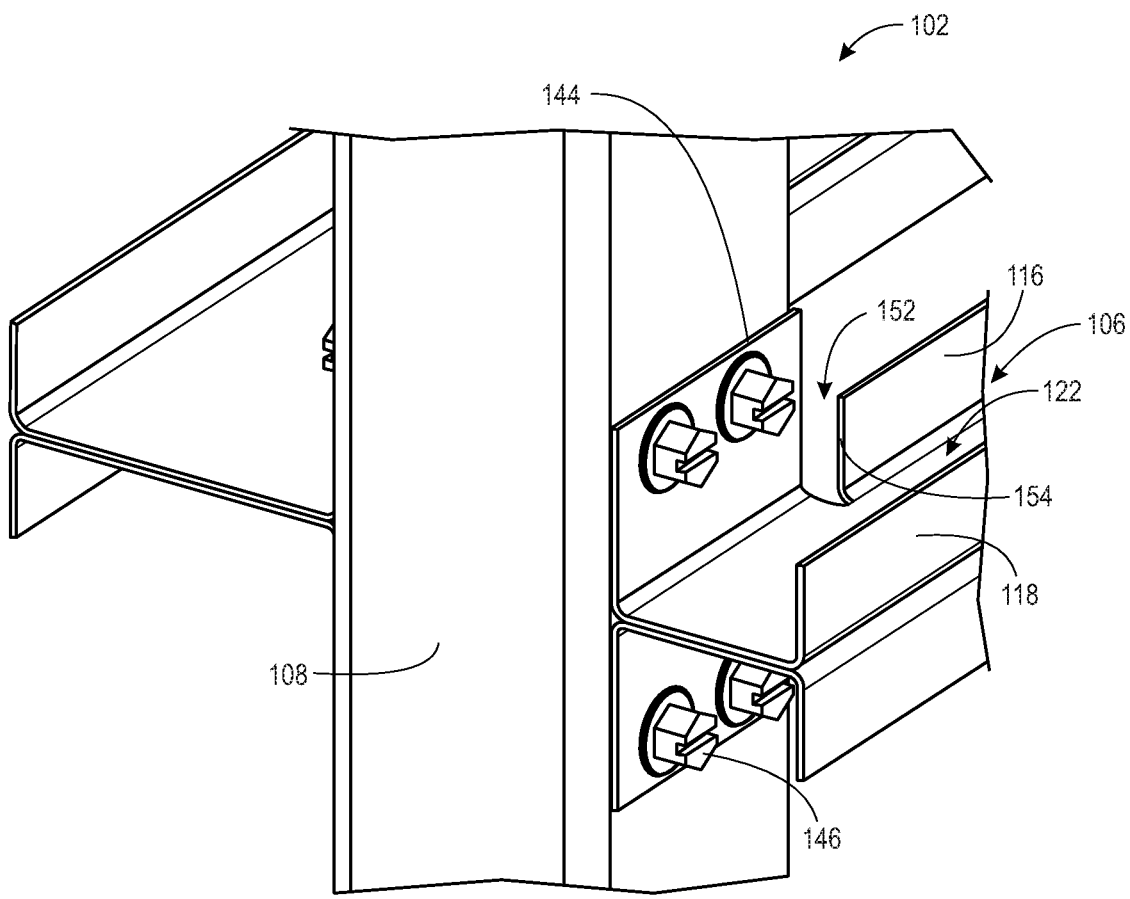
FIG. 17 is a perspective view of a portion of the filter track assembly of FIG. 15, in accordance with embodiments.

FIG. 17 is a perspective view of a portion of the embodiment of the filter track assembly 102 of FIG. 15. As shown, the inner flange 116 may not extend the entire length of the rail 106. Filters 104 may still be easily slid into the groove 122 of the rail 106 in the illustrated embodiment. For instance, as illustrated, the screws 146 may block an opening 152 and be generally flush with inner flange 116, such that filters 104 may be blocked from contacting a face 154 of the inner flange 116.

Figure 18:
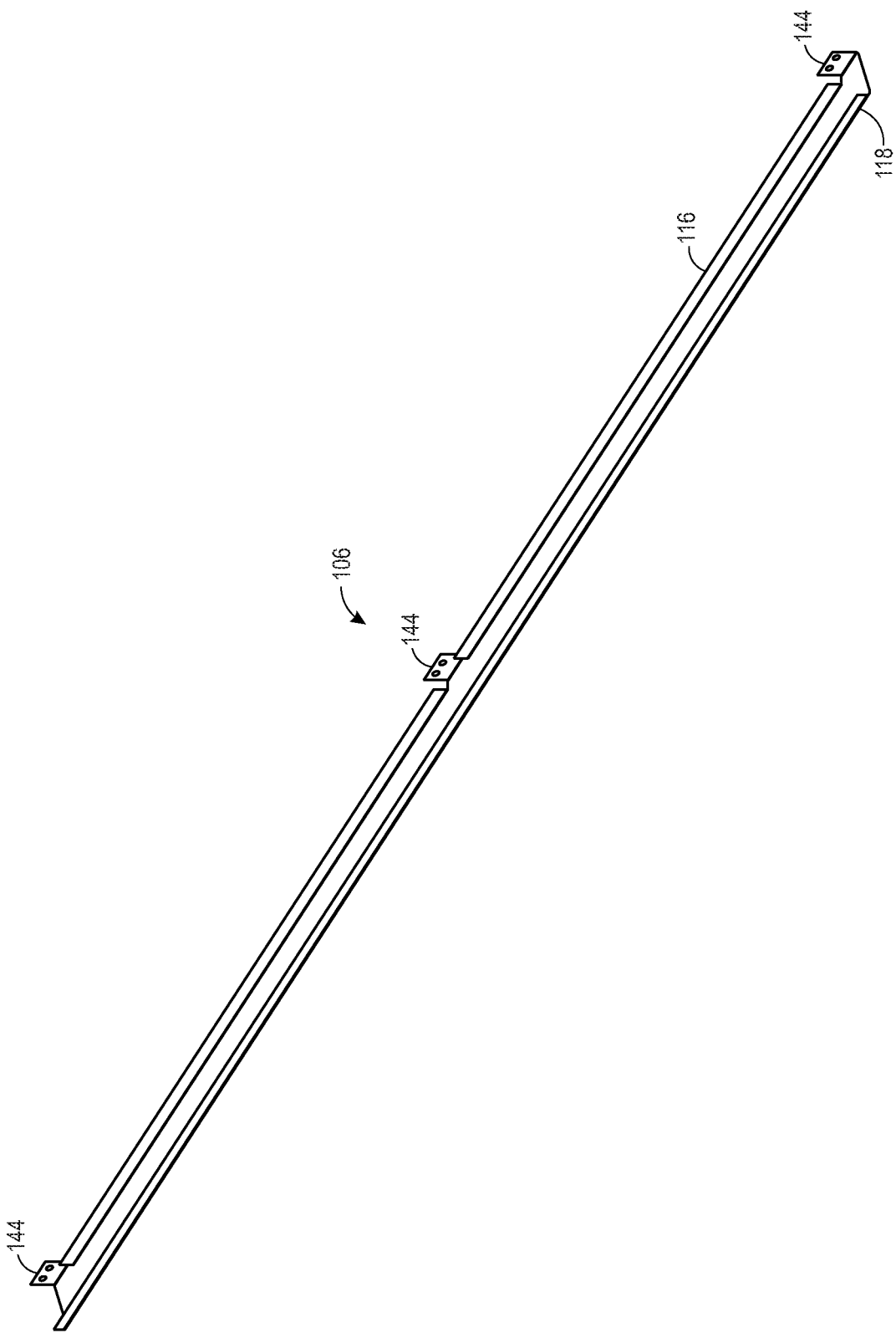
FIG. 18 is a perspective view of the rail of FIG. 17, in accordance with embodiments described herein.

FIG. 18 is a perspective view of the embodiment of the rail 106 of FIG. 17. As illustrated, the rail 106 includes three coupling flanges 144 that may be coupled to vertical bulkheads 108 or one of the horizontal bulkheads 110 of the filter track assembly 102. In other embodiments, the rail 106 may include fewer or more coupling flanges 144. For instance, in some embodiments, the rail 106 may include two, four, five, or more coupling flanges 144, each of which may be coupled to vertical bulkheads 108 or one of the horizontal bulkheads 110 of the filter track assembly 102.

Additionally, the illustrated rail 106 may be made from sheet metal. Moreover, other embodiments of the rail 106 disclosed herein may also be made from sheet metal. For example, the rails 106 may be punched, bent, formed, or otherwise manipulated to form the rails 106 from sheet metal. It should be noted though, in other embodiments, the rails 106 may be made from another material or a combination of materials. For example, in other embodiments, the rails 106 may be made from aluminum.

Figure 19:
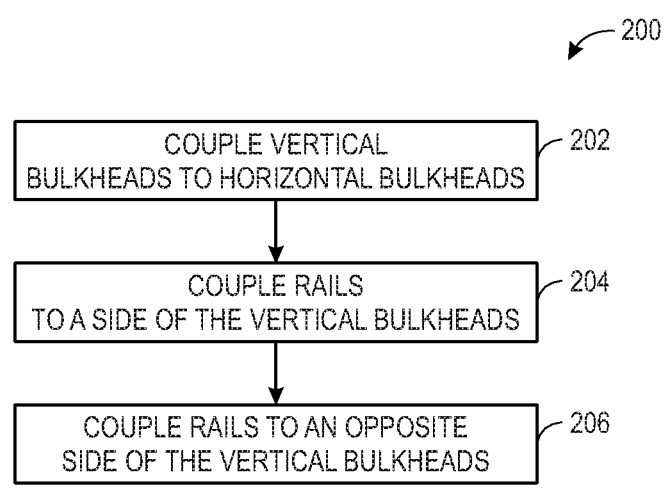
FIG. 19 is a flow chart of a method for assembling a filter track assembly, in accordance with embodiments described herein.

FIG. 19 is a flow chart of a method 200 for assembling the filter track assembly 102. More specifically, the method 200 includes steps that, when completed, result in embodiments of the filter track assembly 102 disclosed above.

At block 202, vertical bulkheads 108 may be coupled to horizontal bulkheads 110. For example, ends of two vertical bulkheads 108 may be coupled two horizontal bulkheads 110. However, as discussed above, more than two vertical bulkheads 108 may be used. For example, three, four, or more vertical bulkheads 108 may be coupled to horizontal bulkheads 110.

At block 204, rails 106 may be coupled to one side of the vertical bulkheads 108. For instance, rails 106a or rails 106b may be coupled via fasteners such as pan head screws to the vertical bulkheads as discussed above. However, in other embodiments, the rails 106 may be coupled to horizontal bulkheads 110 instead of, or in addition to, the vertical bulkheads 108. Moreover, at block 206, rails 106 may be coupled to a side of the vertical bulkheads 108 opposite to the side of the vertical bulkheads to which the rails 106 were coupled at block 204. For instance, if at block 204 rails 106a are coupled to the vertical bulkheads 108, at block 206, rails 106b may be coupled to the vertical bulkheads 108 on an opposite side of the vertical bulkheads 108.

Accordingly, the present disclosure is directed to a filter track assembly in which vertical bulkheads of the filter track assembly may be disposed between rails that are configured to receive air filters. Thus, the presently disclosed embodiments of a filter track assembly enable the weight of the air filters to be more evenly distributed across the filter track assembly than in filter track assemblies with rails positioned on the same side of a vertical bulkhead. As such, the occurrence of sagging or bending of the rails over time may be reduced and/or eliminated.

While only certain features and embodiments of the present disclosure have been illustrated and described, many modifications and changes may occur to those skilled in the art without materially departing from the novel teachings and advantages of the subject matter recited in the claims. For instance, the modifications and changes may include variations in sizes, dimensions, structures, shapes and proportions of the various elements, values of parameters such as temperatures or pressures, mounting arrangements, use of materials, colors, orientations, and the like. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilating, and air conditioning (HVAC) unit, comprising:
a filter track assembly comprising: a bulkhead frame having a first side and a second side opposite the first side, a first rail removably mounted to the bulkhead frame on the first side and configured to support a first air filter on the first side, and a second rail removably mounted to the bulkhead frame on the second side and configured to support a second air filter on the second side, wherein the bulkhead frame is disposed between the first rail and the second rail, such that the first rail and the second rail are spaced apart from one another.

2. The HVAC unit of claim 1, comprising an additional filter track assembly comprising an additional bulkhead frame, a third rail, and a fourth rail, where the third rail and the fourth rail are removably mounted to opposing sides of the additional bulkhead frame.

3. The HVAC unit of claim 1, wherein the first rail is configured to receive a first type of filter, and the second rail is configured to receive a second type of filter different from the first type of filter.

4. The HVAC unit of claim 3, wherein the first type of filter comprises a pleated filter, and the second type of filter comprises a rigid filter or bag filter.

5. The HVAC unit of claim 1, wherein the first and second rails are configured to be removably mounted to the bulkhead frame via screws.

6. The HVAC unit of claim 1, wherein the bulkhead frame is configured to be secured within the HVAC unit, and the HVAC unit comprises a rooftop unit.

7. The HVAC unit of claim 1, wherein the first rail comprises a first flange and a second flange that each extend upward from a surface of the first rail to form a groove that is configured to receive the first air filter.

8. The HVAC unit of claim 7, wherein the first rail is configured to be removably mounted to the bulkhead frame via the first flange.

9. The HVAC unit of claim 7, wherein the first rail comprises a third flange, and the first rail is configured to be removably mounted to the bulkhead frame via the third flange.

10. The HVAC unit of claim 9, wherein the third flange is configured to be removably mounted to the bulkhead frame by screws that are flush with the first flange when secured to the bulkhead frame.

11. A filter track assembly for a heating, ventilation, and air conditioning (HVAC) system, comprising:
a frame;
a first rail comprising a first flange, wherein the first rail is configured to receive a first air filter; and
a second rail comprising a second flange, wherein the second rail is configured to receive a second air filter, wherein the first rail is mounted to a first side of the frame via the first flange, and the second rail is mounted to a second side of the frame, opposite the first side, via the second flange.

12. The filter track assembly of claim 11, wherein the first and second rails are made from sheet metal.

13. The filter track assembly of claim 11, wherein the first rail comprises a first width that is greater than a second width of the second rail.

14. The filter track assembly of claim 11, wherein the frame comprises a bulkhead configured to be secured to an HVAC unit.

15. The filter track assembly of claim 14, wherein the bulkhead is configured to be secured to the HVAC unit via a plurality of fasteners passing through receptacles in the bulkhead.

16. The filter track assembly of claim 15, comprising an L-shaped bracket, wherein the plurality of screws secures the L-shaped bracket to the frame and to an interior surface of the HVAC unit.

17. The filter track assembly of claim 11, wherein the frame comprises a plurality of vertical bulkheads of the filter track assembly.

18. The filter track assembly of claim 17, wherein the first rail and the second rail are coupled to each vertical bulkhead of the plurality of vertical bulkheads.

19. The filter track assembly of claim 17, wherein the plurality of vertical bulkheads comprises three or four vertical bulkheads.

20. A filter track assembly, comprising:
a vertical bulkhead; and a plurality of rails coupled to the vertical bulkhead, wherein each rail of the plurality of rails is configured to support at least one air filter, wherein the plurality of rails comprises a first rail and a second rail that is mounted to an opposite side of the vertical bulkhead from the first rail, and wherein the first rail comprises a first flange that abuts the vertical bulkhead, and the second rail comprises a second flange that abuts the vertical bulkhead.

21. The filter track assembly of claim 20, wherein the plurality of rails comprises a third rail and fourth rail coupled to the vertical bulkhead in a different orientation that the first rail and the second rail.

22. The filter track assembly of claim 21, wherein the third rail abuts the first rail, and the fourth rail abuts the second rail.

23. The filter track assembly of claim 22, wherein the plurality of rails comprises a fifth rail, wherein the first rail is configured to receive a first portion of the at least one air filter, and the fifth rail is configured to receive a second portion of the at least one air filter.

24. The filter track assembly of claim 20, wherein the at least one air filter comprises a pleated filter.

25. The filter track assembly of claim 20, wherein the at least one air filter comprises a rigid or bag filter.

* * * * *